US009032037B2

(12) United States Patent
Huang et al.

(10) Patent No.: US 9,032,037 B2
(45) Date of Patent: May 12, 2015

(54) MAIL SENDING METHOD AND EMAIL SYSTEM

(71) Applicant: Tencent Technology (Shenzhen) Company Limited, Shenzhen (CN)

(72) Inventors: Tieming Huang, Shenzhen (CN); Kai Xie, Shenzhen (CN); Xiaolong Zhang, Shenzhen (CN); Linjia Wan, Shenzhen (CN); Qianya Lin, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 0 days.

(21) Appl. No.: 13/953,588

(22) Filed: Jul. 29, 2013

(65) Prior Publication Data
US 2013/0311588 A1 Nov. 21, 2013

Related U.S. Application Data (63) Continuation of application No. PCT/CN2012/070064, filed on Jan. 5, 2012.

(30) Foreign Application Priority Data

Jan. 30, 2011 (CN) .......................... 2011 1 0033666

(51) Int. Cl.
G06F 15/16 (2006.01)
H04L 12/58 (2006.01)

(52) U.S. Cl.
CPC ................. *H04L 51/12* (2013.01); *H04L 51/28* (2013.01); *H04L 51/14* (2013.01)

(58) Field of Classification Search
None
See application file for complete search history.

(56) References Cited

U.S. PATENT DOCUMENTS

2002/0188689 A1* 12/2002 Michael ......................... 709/206
2007/0067400 A1* 3/2007 Kawakami et al. ........... 709/206
2008/0201433 A1* 8/2008 McDonald ..................... 709/206

FOREIGN PATENT DOCUMENTS

| CN | 1303058 A | 7/2001 |
| CN | 1679286 A | 10/2005 |
| CN | 101115026 A | 1/2008 |
| CN | 101268470 A | 9/2008 |
| EP | 1 115 231 A2 | 7/2001 |

OTHER PUBLICATIONS

International Search Report of corresponding International Application No. PCT/CN2012/070064 from ISA of China Patent Office, dated Apr. 12, 2012.
The Supplementary European Search Report and European Search Opinion of corresponding International PCT Application No. PCT/CN2012/070064, dated Aug. 5, 2014.

* cited by examiner

Primary Examiner — John B Walsh
(74) Attorney, Agent, or Firm — J.C. Patents (57) ABSTRACT

The present invention discloses a mail sending method and an email system and relates to the field of internet communications. The method includes: receiving a mail sending request which carries a mail template filled out by a sender; encapsulating the mail template into an anonymous mail that includes no receiver mailbox ID and no sender mailbox ID; and obtaining a receiver mailbox ID and delivering the encapsulated anonymous mail to a mailbox corresponding to the obtained receiver mailbox ID. The email system includes: a receiving module, an encapsulating module, and a delivering module. The present invention enables a sender to send an anonymous mail to a stranger whose mailbox address is unknown to the sender and provides a service for users to talk about privacy issues.

19 Claims, 7 Drawing Sheets

Please fill in the mail content:

Send   Close

FIG. 3

Happy new year!

Reply   Close

MAIL SENDING METHOD AND EMAIL SYSTEM

CROSS-REFERENCE TO RELATED APPLICATIONS

This application is a continuation of International Application No. PCT/CN2012/070064, filed on Jan. 5, 2012, which claims priority to Chinese Patent Application No. 201110033666.3, filed on Jan. 30, 2011, both of which are hereby incorporated by reference in their entireties.

FIELD OF THE TECHNOLOGY

The present invention relates to the field of internet communications and particularly to a mail sending method and an email system.

BACKGROUND

In the internet, email is a means of communication for information exchange through an electronic approach. It is the most widely applied service of the internet. Through an email system of the internet, a user can send an email to a receiver very quickly at a very low price.

A prior email system provides a mail sending method, including specifically that: a sender fills in a mailbox address of a receiver and mail content in a mail template and then submits a mail sending request to the email system, where the request carries the mail template and a mailbox address of the sender; the email system obtains the mailbox address of the receiver and the mail content from a mail template and then encapsulates the mailbox address of the receiver, the mailbox address of the sender and the mail content into a mail and delivers the encapsulated mail to a mailbox of the receiver.

During the implementation of the present invention, the inventor finds that the prior art has at least the following problems:

Firstly, because the sender must obtain the mailbox address of the receiver in advance, the sender cannot send a mail to a stranger whose mailbox address is unknown; and Secondly, because a mail includes the mailbox address of the sender and the mailbox address of the receiver, the sender and the receiver knows each other and, therefore, they are not free to talk about privacy related issues; as a result, the prior email system cannot provide a service for users to talk about privacy.

SUMMARY

To enable a sender to send an anonymous mail to a stranger whose mailbox address is unknown to the sender and to provide a service for users to talk about privacy issues, the present invention provides a mail sending method and an email system. The technical solutions are as follows:

A mail sending method includes:

receiving a mail sending request which carries a mail template filled out by a sender;

encapsulating the mail template into an anonymous mail that comprises no receiver mailbox ID and no sender mailbox ID; and obtaining a receiver mailbox ID and delivering the anonymous mail to a mailbox corresponding to the receiver mailbox ID.

The obtaining a receiver mailbox ID includes:

selecting randomly one mailbox ID that is different from the sender mailbox ID from a mailbox ID list and using the selected mailbox ID as the receiver mailbox ID, where the mailbox ID list is used to store all mailbox IDs of mailboxes applied for by users; or obtaining a receiver mailbox ID from the mailbox ID list according to a delivery policy.

The obtaining a receiver mailbox ID from the mailbox ID list according to a delivery policy includes:

obtaining mailbox IDs of users located in the same city as the sender from the mailbox ID list, selecting randomly one mailbox ID that is different from the sender mailbox ID from the obtained mailbox IDs, and using the selected mailbox ID as the receiver mailbox ID; or determining gender and age of a receiver according to gender and age of the sender, obtaining mailbox IDs of users that match the determined gender and age of the receiver from the mailbox ID list, selecting randomly one mailbox ID that is different from the sender mailbox ID from the obtained mailbox IDs, and using the selected mailbox ID as the receiver mailbox ID.

After the obtaining a receiver mailbox ID, the method further includes:

storing a mapping relation among the sender mailbox ID, the receiver mailbox ID, and a mail ID of the anonymous mail.

After the delivering the anonymous mail to a mailbox corresponding to the receiver mailbox ID, the method further includes:

receiving an anonymous mail reply request submitted by a receiver, obtaining the sender mailbox ID from the stored mapping relation among the receiver mailbox ID, the sender mailbox ID, and the mail ID according to the mail ID of the anonymous mail replied by the receiver and the receiver mailbox ID, and delivering the anonymous mail replied by the receiver to a mailbox corresponding to the sender mailbox ID.

After the encapsulating the mail template into an anonymous mail that comprises no receiver mailbox ID and no sender mailbox ID, the method further includes:

if no receiver mailbox ID is obtained, caching the anonymous mail in a mail pool and storing a mapping relation between the sender mailbox ID and a mail ID of the anonymous mail.

After the encapsulating the mail template into an anonymous mail that comprises no receiver mailbox ID and no sender mailbox ID, the method further includes:

receiving a mail receiving request submitted by a receiver, selecting one anonymous mail from the mail pool that caches anonymous mails sent by senders, and delivering the selected anonymous mail to a mailbox of the receiver.

The selecting one anonymous mail from the mail pool that caches anonymous mails sent by senders includes:

selecting an anonymous mail sent by a sender located in the same city as the receiver from the mail pool; or selecting one anonymous from the mail pool according to gender and age of the receiver.

After the selecting one anonymous mail from the mail pool that caches anonymous mails sent by senders, the method further includes:

obtaining a mailbox ID of the sender that sends the selected anonymous mail from the stored mapping relation between the sender mailbox ID and the mail ID according to a mail ID of the selected anonymous mail; and storing a mapping relation among the mailbox ID of the sender that sends the selected anonymous mail, the receiver mailbox ID, and the mail ID of the selected anonymous mail.

An email system includes:

a receiving module, configured to receive a mail sending request which carries a mail template filled out by a sender;

an encapsulating module, configured to encapsulate the mail template into an anonymous mail that comprises no receiver mailbox ID and no sender mailbox ID; and a delivering module, configured to obtain a receiver mailbox ID and deliver the anonymous mail to a mailbox corresponding to the receiver mailbox ID.

The delivering module includes:

a selecting unit, configured to select randomly a mailbox ID that is different from the sender mailbox ID from a mailbox ID list and use the selected mailbox ID as the receiver mailbox ID, where the mailbox ID list is used to store all mailbox IDs of mailboxes applied for by users; and a delivering unit, configured to deliver the anonymous mail to a mailbox corresponding to the receiver mailbox ID.

The delivering module includes:

an obtaining unit, configured to obtain a receiver mailbox ID from a mailbox ID list according to a delivery policy; and a delivering unit, configured to deliver the anonymous mail to a mailbox corresponding to the receiver mailbox ID.

The obtaining unit includes:

a first obtaining subunit, configured to obtain mailbox IDs of users located in the same city as the sender from the mailbox ID list, select randomly one mailbox ID that is different from the sender mailbox ID from the obtained mailbox IDs, and use the selected mailbox ID as the receiver mailbox ID; or a second obtaining subunit, configured to determine gender and age of a receiver according to gender and age of the sender, obtain mailbox IDs of users that match the determined gender and age of the receiver from the mailbox ID list, select randomly one mailbox ID which is different from the sender mailbox ID from the obtained mailbox IDs, and use the selected mailbox ID as the receiver mailbox ID.

The email system further includes:

a storing module, configured to store a mapping relation among the sender mailbox ID, the receiver mailbox ID, and a mail ID of the anonymous mail.

The email system further includes:

a reply module, configured to receive an anonymous mail reply request submitted by a receiver, obtain the sender mailbox ID from the stored mapping relation among the receiver mailbox ID, the sender mailbox ID, and the mail ID according to the mail ID of the anonymous mail replied by the receiver and the receiver mailbox ID, and deliver the anonymous mail replied by the receiver to a mailbox corresponding to the sender mailbox ID.

The email system further includes:

a cache module, configured to, if no receiver mailbox ID is obtained, cache the anonymous mail in a mail pool and store a mapping relation between the sender mailbox ID and a mail ID of the anonymous mail.

The email system further includes:

a mail receiving module, configured to receive a mail receiving request submitted by a receiver, select one anonymous mail from a mail pool that caches anonymous mails sent by senders, and deliver the selected anonymous mail to a mailbox of the receiver.

The mail receiving module is configured to receive a mail receiving request submitted by a receiver and select one anonymous mail sent by a sender located in the same city as the receiver from the mail pool; or, select one anonymous mail from the mail pool according to gender and age of the receiver and deliver the selected anonymous mail to a mailbox of the receiver.

The mail receiving module further includes:

a storing unit, configured to obtain a mailbox ID of a sender that sends the selected anonymous mail from a stored mapping relation between the sender mailbox ID and the mail ID according to the mail ID of the selected anonymous mail; and store a mapping relation among the mailbox ID of the sender that sends the selected anonymous mail, the receiver mailbox ID, and the mail ID of the selected anonymous mail.

In the present invention, a receiver mailbox ID is selected for an anonymous mail sent by a sender and the anonymous mail is delivered to the selected receiver mailbox, where the anonymous mail includes no sender mailbox ID and no receiver mailbox ID. Thus, the mail sent by the sender is sent to a stranger whose mailbox ID is unknown to the sender. In addition, because the sender and the receiver are unknown to each other, a service for the sender and the receiver to talk about privacy related issues can be provided.

DETAILED DESCRIPTION

To make the purpose, technical solution, and advantage of the present invention clearer, embodiments of the present invention will be described hereinafter in detail with reference to the accompanying drawings.

First Embodiment

Figure 1:
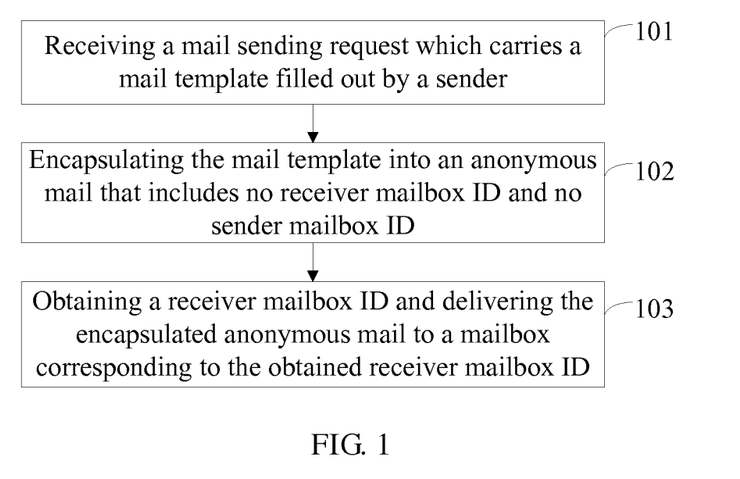
FIG. 1 is a flowchart of a mail sending method according to a first embodiment of the invention.

As shown in FIG. 1, an embodiment of the present invention provides a mail sending method, including:

Step 101: Receive a mail sending request which carries a mail template filled out by a sender;

Step 102: Encapsulate the mail template into an anonymous mail that includes no receiver mailbox ID and no sender mailbox ID; and Step 103: Obtain a receiver mailbox ID and deliver the encapsulated anonymous mail to a mailbox corresponding to the obtained receiver mailbox ID.

In the embodiment of the present invention, a receiver mailbox ID is selected for the anonymous mail sent by the sender and the anonymous mail is delivered to the selected receiver mailbox, where the anonymous mail does not include the sender mailbox ID or the receiver mailbox ID. Thus, the mail sent by the sender is sent to a stranger whose mailbox ID is unknown to the sender. In addition, because the sender and the receiver are unknown to each other, a service for the sender and the receiver to talk about privacy related issues can be provided.

Second Embodiment

Figure 2:
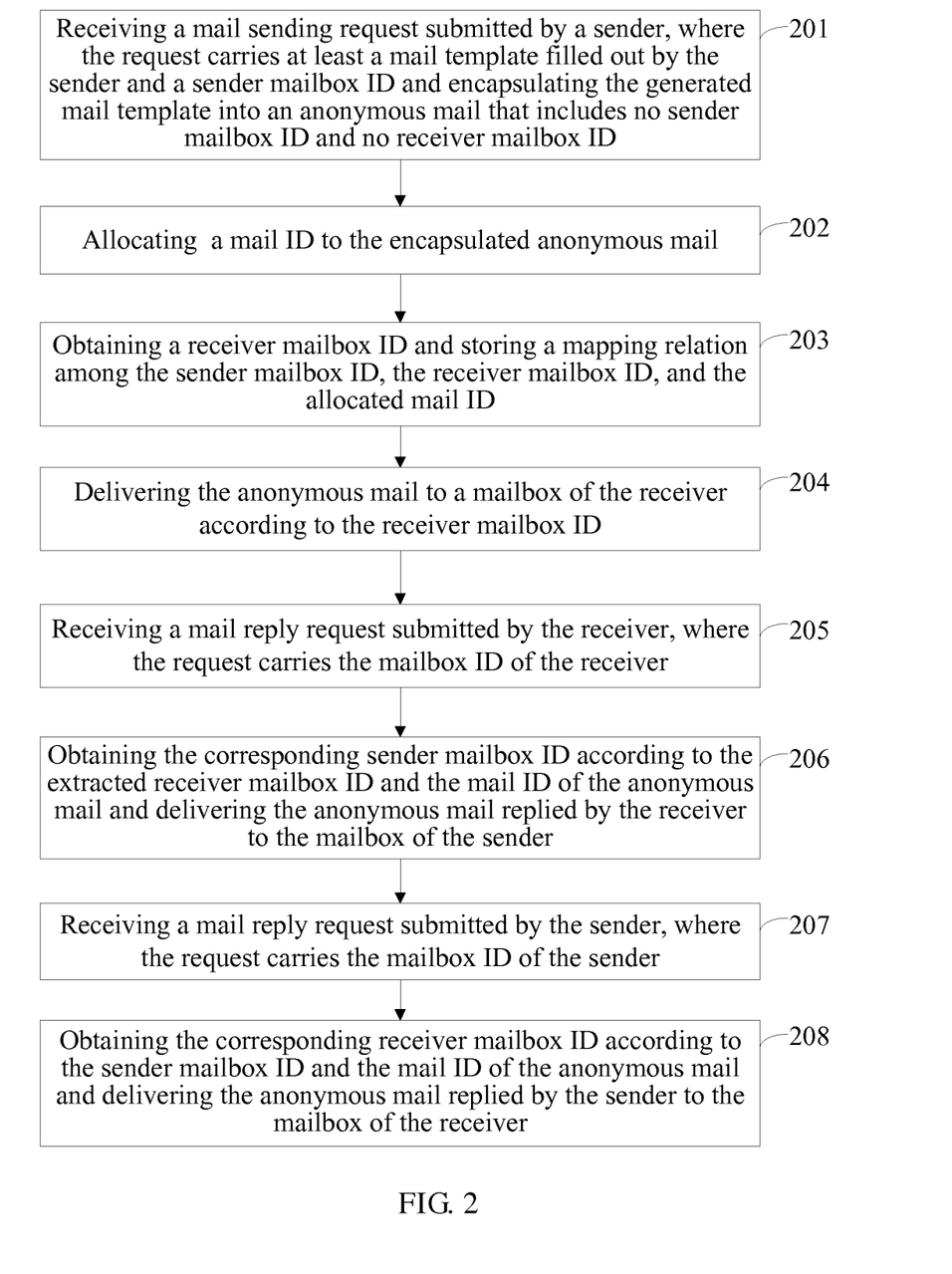
FIG. 2 is a flowchart of a mail sending method according to a second embodiment of the invention.

As shown in FIG. 2, an embodiment of the present invention provides a mail sending method, including:

Step 201: An email system receives a mail sending request submitted by a sender, where the request carries at least a mail template filled out by the sender and a sender mailbox ID and encapsulates the generated mail template into an anonymous mail that includes no sender mailbox ID and no receiver mailbox ID.

Before the sender sends the mail, the sender needs to request the email system for login to a mailbox and the email system displays the login mailbox of the sender on a client side. The mailbox displayed by the email system on the client side includes one or more mail templates. The sender may select a mailbox template used to fill in the mail in the displayed mailbox and then the mail template selected by the sender is generated and the mail template is displayed to the sender on the client side.

After the mail template is displayed to the sender on the client side, the sender may fill in the mail content in a blank area used to fill in mail content in the displayed mail template. After the complete mail content is filled in, the sender may submit a mail sending request to the email system, where the request carries the mail template filled out by the sender and the sender mailbox ID.

Further, after the email system receivers the mail sending request submitted by the sender, the email system may check whether the area used to fill in mail content in the mail template is blank and check whether the mail content includes more characters than a preset threshold. If the area is blank or if the mail content includes more characters than the threshold, the email system prompts the sender. If the area is not blank and the mail content is within the threshold, the email system executes the operation of mail encapsulation.

Further, before the email system encapsulates the mail template into an anonymous mail, the email system may check whether the mail content in the mail template includes junk information and if the mail template includes junk information, discards the mail template. The junk information includes advertisement information, offensive words or sensitive words.

It should be noted that: in the embodiment of the present invention, the mail encapsulated by the email system includes the mail content but does not include the receiver mailbox ID and the sender mailbox ID. Thus, the mail encapsulated by the email system is an anonymous mail.

In the embodiment of the present invention, receiver and sender are only relative concepts. The sender is a user that initiates a mail and the receiver is a user that receives the mail.

Figure 3:
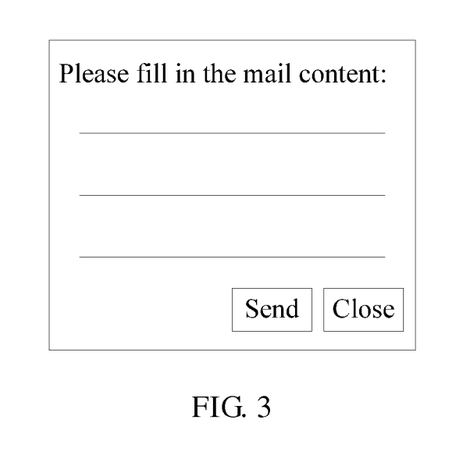
FIG. 3 is a schematic diagram of a mail template according to the second embodiment of the invention.

For example, FIG. 3 shows a mail template displayed by the client side to the receiver, where the mail template includes a blank area used to fill in mail content, a "Send" button, and a "Close" button. The mail template shown in FIG. 3 does not include an input box used to fill in the receiver mailbox ID and does not include the sender mailbox ID.

In the embodiment of the present invention, the sender mailbox ID may be the address of the mailbox of the sender and the receiver mailbox ID may be the address of the mailbox of the receiver.

Step 202: The email system allocates a mail ID to the encapsulated anonymous mail.

Specifically, the email system allocates a mail ID, which uniquely identifies the anonymous mail, to the encapsulated anonymous mail.

For example, the sender fills in "Happy new year!" as the mail content in the blank area used to fill in mail content in the mail template shown in FIG. 3 and clicks the "Send" button in the mail template to submit a mail sending request to the email system, where the request carries the mail template shown in FIG. 3 and the sender mailbox ID "Sender ID1".

The email system receives the mail sending request submitted by the sender and detects that the area in the mail template used to fill in mail content is not blank. Then the email system counts the number of characters included in the mail content and judges that the counted number of characters does not exceed the preset threshold. Then the email system encapsulates the mail template shown in FIG. 3 into an anonymous mail shown in FIG. 4 which includes only the mail content and does not include the receiver mailbox ID and the sender mailbox ID. Then the email system allocates mail ID "Email ID1" to the anonymous mail shown in FIG. 4.

Step 203: The email system obtains a receiver mailbox ID and stores a mapping relation among the sender mailbox ID, the receiver mailbox ID, and the allocated mail ID.

Specifically, the email system obtain one receiver mailbox ID from a mailbox ID list and stores the sender mailbox ID, the obtained receiver mailbox ID, and the allocated mail ID as one entry in the mapping relation among the sender mailbox ID, the receiver mailbox ID and the mail ID. The mailbox ID list is used to store the mailbox IDs of all mailboxes registered with the email system.

Each user needs to apply for a mailbox in the email system and registers a mailbox ID for the mailbox when applying for the mailbox; the email system may store the mailbox ID registered by each user in the mailbox ID list. In addition to the mailbox ID registered for the applied mailbox in the email system, the user may also register related information for the applied mailbox in the email system, where the related information may include the city where the user is located and the gender and/or age of the user. In addition to the mailbox ID of the mailbox applied for by the user, the mailbox ID list may also store the related information of the mailbox applied for by the user.

For example, the sender mailbox ID "Sender ID1" is extracted from the login mailbox of the sender, the receiver mailbox ID "Receiver ID1" is obtained from the mailbox ID list and the extracted sender mailbox ID "Sender ID1", the receiver mailbox ID "Receiver ID1" and the allocated mail ID "Email ID1" are stored as an entry in the mapping relation among the sender mailbox ID, the receiver mailbox ID and the mail ID as shown in Table 1.

TABLE 1

| sender Mailbox ID | receiver Mailbox ID | Mail ID |
|---|---|---|
| Sender ID1 | Receiver ID1 | Email ID1 |
| ... | ... | ... |

In the embodiment of the present invention, obtaining the receiver mailbox ID specifically includes: selecting a mailbox ID that is different from the sender mailbox ID randomly from the mailbox ID list and using the selected mailbox ID as the receiver mailbox ID; or selecting a mailbox ID that is different from the sender mailbox ID from the mailbox ID list according to a delivery policy and using the selected mailbox ID as the receiver mailbox ID.

The selecting a mailbox ID that is different from the sender mailbox ID from the mailbox ID list according to a delivery policy and using the selected mailbox ID as the receiver mailbox ID includes the following two schemes:

Firstly select the mailbox ID of a user located the same city as the sender from the mailbox ID list and use the selected mailbox ID as the receiver mailbox ID.

Specifically, this includes: obtaining the IP (Internet Protocol, Internet Protocol) address of the mailbox used by the sender, determining the city where the sender is located according to the obtained IP address, obtaining the mailbox IDs of all users located in the same city as the sender from the mailbox ID list according to the obtained city, and selecting randomly one mailbox ID that is different from the sender mailbox ID from all the obtained mailbox IDs as the receiver mailbox ID.

Secondly determine the gender and age of the receiver according to the gender and age of the sender, obtain mailbox IDs of users that match the determined gender and age of the receiver from the mailbox ID list, and select randomly one mailbox ID from the obtained mailbox IDs as the receiver mailbox ID.

The email system extracts the gender of the sender from the mailbox of the sender and determines the gender of the receiver according to the gender of the sender. In the embodiment, it can be set that the probability where the email system determines that the sender and the receiver have the same gender is higher than the probability where the email system determines that the sender and the receiver have different genders.

Figure 5:
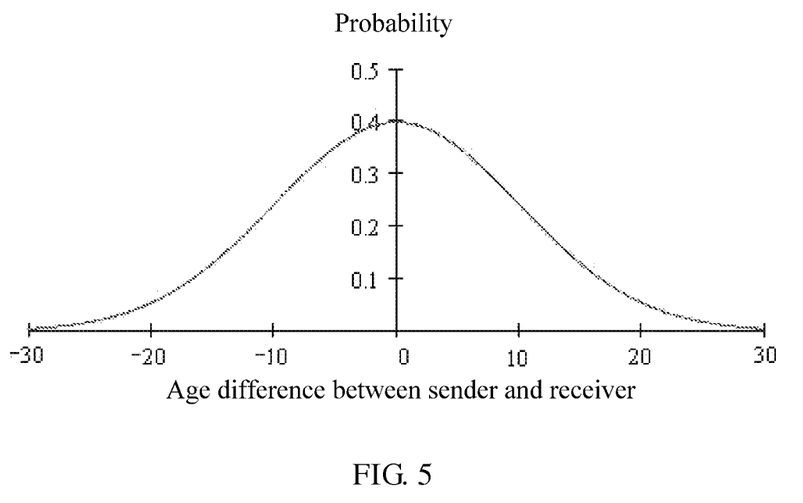
FIG. 5 is a schematic diagram of normal distribution according to the second embodiment of the invention.

Then, the email system extracts the age of the sender from the mailbox of the sender and determines the age of the receiver according to the age of the sender. In the embodiment, the email system may be set to determine the age of the receiver according to the age of the sender based on the normal distribution shown in FIG. 5, where the email system may define that the probability where the sender and the receiver are of the same age is highest and define that the probability where the age difference between the receiver and the sender exceeds 30 years is nearly zero.

In the embodiment, a mail pool may be set to temporarily cache the anonymous mail sent by the sender; if, after encapsulating the anonymous mail for the sender, the email system fails to obtain the receiver mailbox ID, the email system may temporarily cache the anonymous mail in the mail pool and store a mapping relation between the sender mailbox ID and mail ID of the anonymous mail.

Step 204: The email system delivers the encapsulated anonymous mail to a mailbox of the receiver according to the receiver mailbox ID.

In the embodiment, the email system selects the receiver mailbox ID for the anonymous mail sent by the sender and delivers the anonymous mail to the mailbox of the selected receiver. Thus, the anonymous mail sent by the sender is delivered to a stranger whose mailbox ID is unknown to the sender. In addition, because the mail does not include the receiver mailbox ID or the sender mailbox ID, the sender and the receiver do not know each other. Therefore, a service can be provided for the sender and the receiver to talk about privacy issues.

The receiver logs into his/her mailbox at a client side and opens the anonymous mail delivered by the email system in the login mailbox of the receiver. For example, the receiver may log into the mailbox with the mailbox ID "Receiver ID1" and open the anonymous mail shown in FIG. 4 in the mailbox.

In the embodiment, any receiver may actively request receiving anonymous mails from the email system, which specifically includes the following steps (1)-(3):

(1). The email system receives a mail receiving request sent by the receiver, where the request carries the receiver mailbox ID.

The receiver may log into his/her mailbox and send the mail receiving request through the login mailbox.

(2). The email system selects an anonymous mail from the mail pool, obtains the mailbox ID of the sender that sends the anonymous mail according to the mailbox ID of the selected anonymous mail, and stores a mapping relation among the obtained sender mailbox ID, the receiver mailbox ID, and the mail ID of the anonymous mail.

The email system obtains the mailbox ID of the sender that sends the anonymous mail from the already stored mapping relation between the sender mailbox ID and mail ID according to the mailbox ID of the selected anonymous mail.

The email system may select randomly one anonymous mail from the mail pool or select one anonymous mail according to a delivery policy.

The email system selects one anonymous mail according to a delivery policy, which includes the following two schemes:

First scheme: the email system selects the anonymous mail sent by a sender located in the same city as the receiver.

Specifically, the email system obtains the IP address of the receiver, determines the city where the receiver is located according to the obtained IP address, obtains mailbox IDs of senders located in the same city as the receiver from the mailbox ID list, obtains mail IDs of the anonymous mails sent by the senders from the stored mapping relation between the sender mailbox ID and mail ID according to the obtained mailbox IDs of senders, obtains the corresponding anonymous mails from the mail pool according to the obtained mail IDs, and selects randomly one anonymous mail from the obtained anonymous mails.

Second scheme: the email system selects one anonymous mail from the mail pool according to the gender and age of the receiver.

Specifically, the email system determines the gender and age of the sender according to the gender and age of the receiver, obtains mailbox IDs of senders that match the determined gender and age of the sender from the mailbox ID list, obtains the mail IDs of anonymous mails sent by the senders from the stored mapping relation between the sender mailbox ID and mail ID according to the determined mailbox IDs of senders, obtains the corresponding anonymous mails from the mail pool according to the obtained mail IDs, and selects randomly one anonymous mail from the obtained anonymous mails.

After selecting an anonymous mail from the mail pool, the email system removes the selected anonymous mail from the mail pool.

Optionally, after the receiver reads the opened anonymous mail, the receiver may reply a mail to the sender directly. Replying a mail to the sender includes the following steps 205-206:

Step 205: the email system receives a mail reply request submitted by the receiver, where the request carries the receiver mailbox ID.

Figure 4:
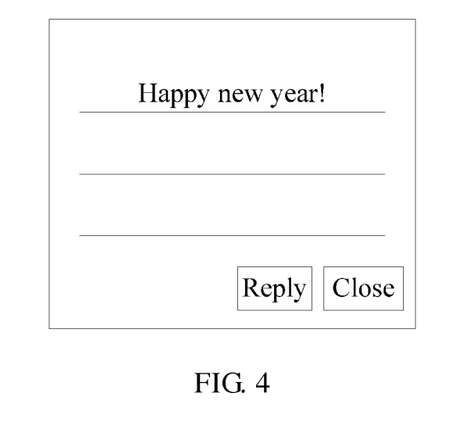
FIG. 4 is a schematic diagram of a first anonymous mail according to the second embodiment of the invention.
Figure 6:
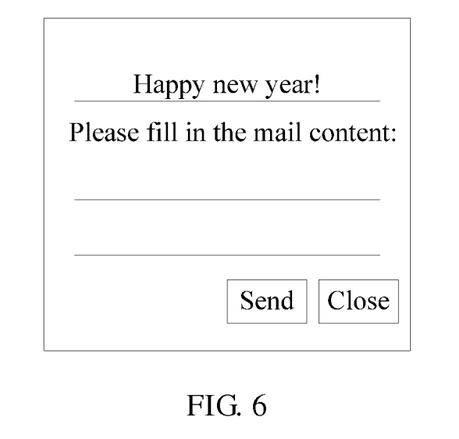
FIG. 6 is a schematic diagram of a second anonymous mail according to the second embodiment of the invention.

For example, when the receiver reads the anonymous mail shown in FIG. 4 in his/her mailbox, the receiver clicks the "Reply" button and the mailbox of the receiver sets a blank area as shown in FIG. 6 for filling in mail content in the mail shown in FIG. 4; the receiver may fills in the mail content in the blank area used for filling in mail content shown in FIG. 6, and then clink the "Send" button to submit the mail reply request, where the request carries the receiver mailbox ID "Receiver ID1" and the mail ID of the anonymous mail "Email ID1".

Step 206: the email system obtains the corresponding sender mailbox ID according to the receiver mailbox ID and the mail ID of the anonymous mail and delivers the anonymous mail replied by the receiver to the mailbox of the sender.

Specifically, the email system obtains the corresponding sender mailbox ID from the stored mapping relation among the sender mailbox ID, the receiver mailbox ID and the mail ID according to the receiver mailbox ID and the mail ID of the anonymous mail; and delivers the anonymous mail replied by the receiver to the mailbox of the sender according to the sender mailbox ID.

The email system extracts the mail ID of the anonymous mail from the anonymous mail replied by the receiver.

Figure 7:
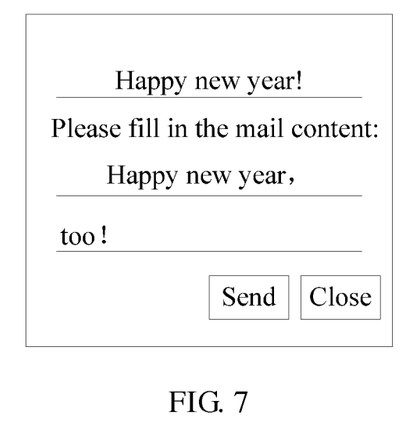
FIG. 7 is a schematic diagram of a third anonymous mail according to the second embodiment of the invention.

For example, the receiver may fill in the mail content "Happy new year, too!" in the mail shown in FIG. 6 to get the mail shown in FIG. 7, and then click the "Send" button to submit a mail reply request to the email system, where the request carries the receiver mailbox ID "Receiver ID1" and the mail ID of the anonymous mail "Email ID1".

The email system receives the mail reply request submitted by the receiver and extracts the mail ID of the anonymous mail "Email ID1" from the anonymous mail replied by the receiver, searches the corresponding sender mailbox ID "Sender ID1" in the mapping relation among the sender mailbox ID, the receiver mailbox ID, and the mail ID shown in Table 1 according to the receiver mailbox ID "Receiver ID1" and the mail ID of the anonymous mail replied by the receiver "Email ID1", and delivers the anonymous mail replied by the receiver to the mailbox of the sender according to the found sender mailbox ID "Sender ID1".

Optionally, the sender may open and read the anonymous mail replied by the receiver in the mailbox of the sender and then the sender may also reply to the anonymous mail replied by the receiver to the receiver. The sender replies to the anonymous mail of the receiver, which includes the following steps 207-208:

Step 207: the email system receives a mail reply request submitted by the sender, where the request carries the sender mailbox ID.

The sender may reply to the anonymous mail replied by the receiver through the mailbox of the sender.

Step 208: the email system obtains the corresponding receiver mailbox ID according to the sender mailbox ID and mail ID of the anonymous mail and delivers the anonymous mail replied by the sender to the mailbox of the receiver.

Specifically, the email system obtains the corresponding receiver mailbox ID from the stored mapping relation among the sender mailbox ID, the receiver mailbox ID and the mail ID according to the sender mailbox ID and the mail ID of the replied anonymous mail; and delivers the anonymous mail replied by the sender to the mailbox of the receiver according to the receiver mailbox ID.

The mail ID of the anonymous mail is extracted from the anonymous mail replied by the sender.

The above steps 205-208 are repeated if the sender and the receiver continue to reply to the anonymous mails they receive.

In the embodiment of the present invention, the email system selects a receiver mailbox ID for the anonymous mail sent by the sender and delivers the anonymous mail to the selected receiver mailbox, and the anonymous mails replied by the sender and the receiver to each other do not include the mailbox IDs of the sender and the receiver. Thus, the mail sent by the sender is sent to a stranger whose mailbox ID is unknown to the sender. In addition, because the mail does not include the receiver mailbox ID and the sender mailbox ID, the sender and the receiver do not know each other. Therefore, a service can be provided for the sender and the receiver to talk about privacy issues.

Third Embodiment

Figure 8:
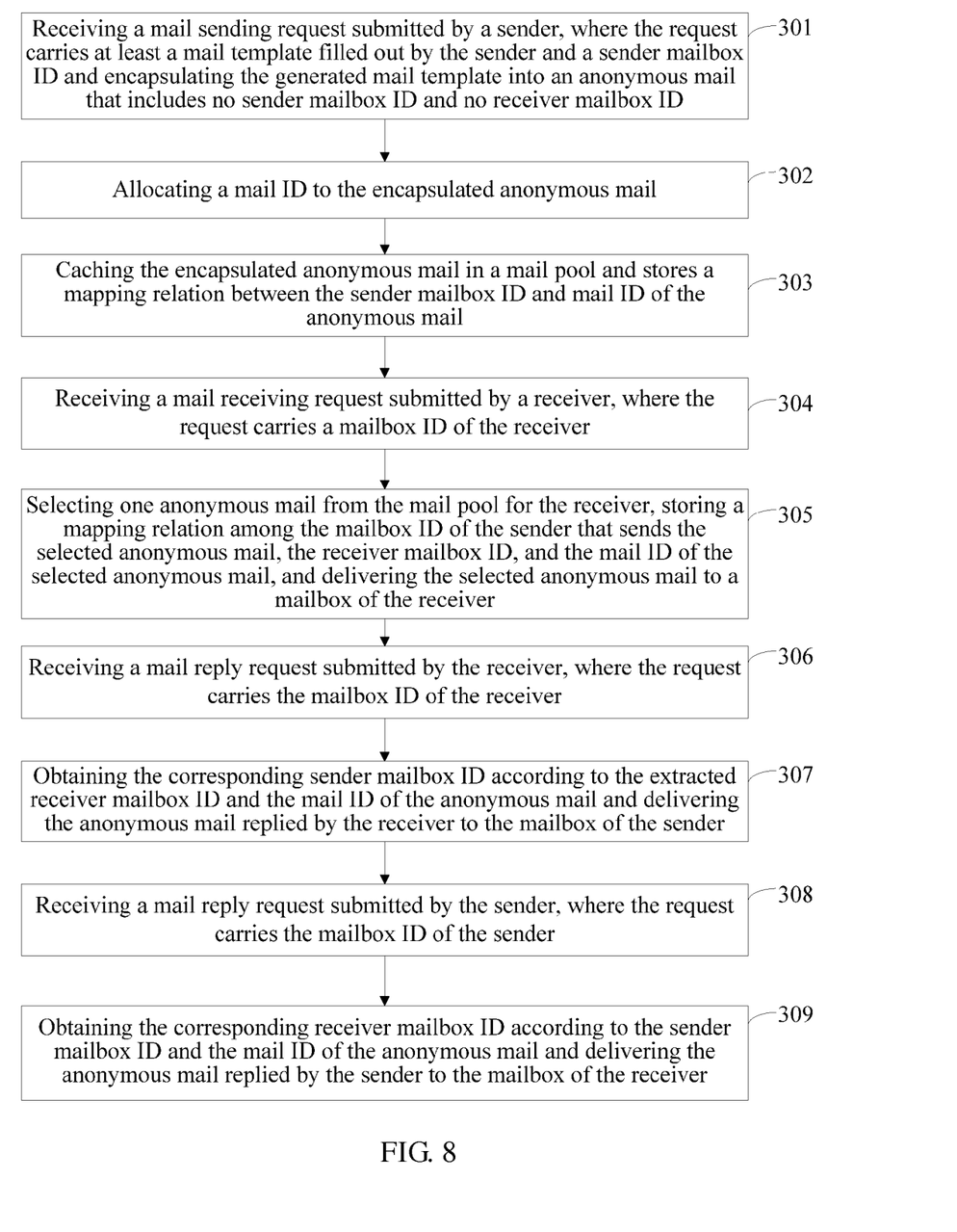
FIG. 8 is a flowchart of a mail sending method according to a third embodiment of the invention.

As shown in FIG. 8, the embodiment of the present invention provides a mail sending method, including the following steps:

Steps 301-302: These steps are the same as steps 201-202 in second embodiment and will not be repeated here.

Step 303: The email system caches the encapsulated anonymous mail in a mail pool and stores a mapping relation between the sender mailbox ID and mail ID of the anonymous mail.

The email system may generate an anonymous mail for the sender and temporarily caches the generated anonymous mail in the mail pool.

Any other receiver may request to receive an anonymous mail from the email system.

The process of receiving an anonymous mail includes the following steps 304-305:

Step 304: the email system receives a mail receiving request submitted by a receiver, where the request carries a mailbox ID of the receiver.

The receiver may log into his/her mailbox and send the mail receiving request to the email system through the login mailbox.

Step 305: The email system selects one anonymous mail from the mail pool for the receiver, stores a mapping relation among the mailbox ID of the sender that sends the selected anonymous mail, the receiver mailbox ID, and the mail ID of the selected anonymous mail, and delivers the selected anonymous mail to a mailbox of the receiver.

Specifically, the email system selects one anonymous mail from the mail pool, obtains the mailbox ID of the sender that sends the selected anonymous mail from the stored mapping relation between the sender mailbox ID and mail ID according to the mail ID of the selected anonymous mail, stores the obtained sender mailbox ID, the receiver mailbox ID, and the selected mailbox ID as one entry in the mapping relation between the sender mailbox ID, the receiver mailbox ID, and the mail ID, and delivers the selected anonymous mail to the mailbox of the receiver according to the receiver mailbox ID.

The email system selects one anonymous mail from the mail pool for the receiver, which may specifically include: selecting one anonymous mail randomly from the mail pool and delivering the selected anonymous mail to the mailbox of the receiver; or selecting one anonymous mail from the mail pool according to a delivery policy and delivering the selected anonymous mail to the mailbox of the receiver.

Selecting one anonymous mail from the mail pool according to a delivery policy and delivering the selected anonymous mail to the mailbox of the receiver includes the following two schemes:

First scheme: selecting an anonymous mail sent by a sender located in the same city as the receiver from the mail pool and delivering the selected anonymous mail to the mailbox of the receiver.

Specifically, the email system obtains the IP address of the receiver, determines the city where the receiver is located according to the obtained IP address, obtains mailbox IDs of senders located in the same city as the receiver from the mailbox ID list, obtains mailbox IDs of the anonymous mails sent by the senders from the stored mapping relation between the sender mailbox ID and mail ID according to the obtained mailbox IDs of senders, obtains the corresponding anonymous mails from the mail pool according to the obtained mail IDs, and selects randomly one anonymous mail from the obtained anonymous mails.

Second scheme: selecting one anonymous mail according to the gender and age of the receiver and delivering the selected anonymous mail to the mailbox of the receiver.

Specifically, the email system determines the gender and age of the sender according to the gender and age of the receiver, obtains mailbox IDs of users that match the determined gender and age of the sender from the mailbox ID list, obtains the mail IDs of the corresponding anonymous mails from the stored mapping relation between the sender mailbox ID and the mail ID according to the determined mailbox IDs, obtains the corresponding anonymous mails from the mail pool according to the obtained mail IDs, and selects randomly one anonymous mail from the obtained anonymous mails.

After selecting one anonymous mail from the mail pool, the email system removes the selected anonymous mail from the mail pool.

The receiver may log into his/her mailbox to open and read the received anonymous mail. Then the receiver and the sender can reply anonymous mails to each other. The specific process includes the following steps 306-309:

Steps 306-309: These steps are the same as steps 205-208 in second embodiment and will not be repeated here.

In the embodiment of the present invention, the email system selects a receiver mailbox ID for the anonymous mail sent by the sender and delivers the anonymous mail to the selected receiver mailbox, and the anonymous mails replied by the sender and the receiver to each other do not include the mailbox IDs of the sender and the receiver. Thus, the mail sent by the sender is sent to a stranger whose mailbox ID is unknown to the sender. In addition, because the mail does not include the receiver mailbox ID and the sender mailbox ID, the sender and the receiver do not know each other. Therefore, a service can be provided for the sender and the receiver to talk about privacy issues.

Fourth Embodiment

Figure 9:
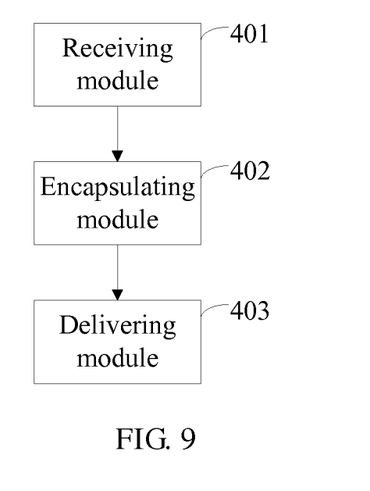
FIG. 9 is a schematic diagram of an email system according to a fourth embodiment of the invention.

As shown in FIG. 9, the embodiment of the present invention provides an email system, including:

a receiving module 401, configured to receive a mail sending request which carries a mail template filled out by a sender;

an encapsulating module 402, configured to encapsulate the mail template into an anonymous mail that does not include a receiver mailbox ID and a sender mailbox ID; and a delivering module 403, configured to obtain a receiver mailbox ID and deliver the encapsulated anonymous mail to a mailbox corresponding to the obtained receiver mailbox ID.

The delivering module 403 includes:

a selecting unit, configured to select randomly a mailbox ID that is different from the sender mailbox ID from a mailbox ID list and use the selected mailbox ID as the receiver mailbox ID, where the mailbox ID list is used to store mailbox IDs of all mailboxes applied for by users; and a delivering unit, configured to deliver the anonymous mail to the mailbox corresponding to the receiver mailbox ID.

The delivering module 403 includes:

an obtaining unit, configured to obtain the receiver mailbox ID from the mailbox ID list according to a delivery policy; and a delivering unit, configured to deliver the anonymous mail to the mailbox corresponding to the receiver mailbox ID.

Further, the email system also includes:

a storing module, configured to store a mapping relation among the sender mailbox ID, the receiver mailbox ID, and mail ID of the anonymous mail.

The obtaining unit includes:

a first obtaining subunit, configured to obtain mailbox IDs of users located in the same city as the sender from the mailbox ID list, select randomly one mailbox ID that is different from the sender mailbox ID from the obtained mailbox IDs, and use the selected mailbox ID as the receiver mailbox ID; or a second obtaining subunit, configured to determine the gender and age of the receiver according to the gender and age of the sender, obtain mailbox IDs of users that match the determined gender and age of the receiver from the mailbox ID list, select randomly one mailbox ID which is different from the sender mailbox ID from the obtained mailbox IDs, and use the selected mailbox ID as the receiver mailbox ID.

Further, the email system also includes:

a reply module, configured to receive an anonymous mail reply request submitted by a receiver, obtain the sender mailbox ID from the stored mapping relation among the receiver mailbox ID, the sender mailbox ID, and the mail ID according to the mail ID of the anonymous mail replied by the receiver and the receiver mailbox ID, and deliver the anonymous mail replied by the receiver to the mailbox corresponding to the sender mailbox ID.

Further, the email system also includes:

a cache module, configured to, if no receiver mailbox ID is obtained, cache the anonymous mail in a mail pool and store a mapping relation between the sender mailbox ID and mail ID of the anonymous mail.

Further, the email system also includes:

a mail receiving module, configured to receive a mail receiving request submitted by a receiver, select one anonymous mail from the mail pool that caches anonymous mails sent by senders, and deliver the selected anonymous mail to a mailbox of the receiver.

Further, the mail receiving module is configured to receive a mail receiving request submitted by a receiver and select an anonymous mail sent by a sender located in the same city as the receiver from the mail pool; or, select one anonymous mail from the mail pool according to the gender and age of the receiver and deliver the selected anonymous mail to a mailbox of the receiver.

Further, the mail receiving module includes:

a storing unit, configured to obtain a mailbox ID of a sender that sends the selected anonymous mail from the stored mapping relation between the sender mailbox ID and mail ID according to the mail ID of the selected anonymous mail; and store the mapping relation among the mailbox ID of the sender that sends the selected anonymous mail, the receiver mailbox ID, and the mail ID of the selected anonymous mail.

In the embodiment of the present invention, the email system selects a receiver mailbox ID for the anonymous mail sent by the sender and delivers the anonymous mail to the selected receiver mailbox, and the anonymous mails replied by the sender and the receiver to each other do not include the mailbox IDs of the sender and the receiver. Thus, the mail sent by the sender is sent to a stranger whose mailbox ID is unknown to the sender. In addition, because the mail does not include the receiver mailbox ID and the sender mailbox ID, the sender and the receiver do not know each other. Therefore, a service can be provided for the sender and the receiver to talk about privacy issues.

It should be noted that, when the email system provided by the above embodiments sends a mail, the division of the above functional modules is only an exemplary description. In practice, the above functions may be assigned to different functional modules. This means that the internal structure of the email system is divided to different functional modules to complete all or a portion of the above described functions. In addition, the email system for sending mails provided in the above embodiments is based on the same idea of the mail sending method embodiments. The specific implementation process is described in the method embodiments and will not be repeated here.

All or a portion of the technical solutions provided in the foregoing embodiments may be implemented through software programming, where the software program is stored in a readable storage medium, such as a hard disc, compact disc, or a floppy disk in a computer.

Only exemplary embodiments of the present invention are described above, but the present invention is not limited thereto. Any modifications, equivalent substitutions and improvement within the spirit and scope of the present invention shall fall within the scope of the present invention.

What is claimed is:

1. A mail sending method, comprising:
receiving, by a processor of an email system, a mail sending request which carries a mail template filled out by a sender;
encapsulating, by the processor, the mail template into an anonymous mail that comprises no receiver mailbox ID and no sender mailbox ID; and
obtaining, by the processor, a receiver mailbox ID and delivering, by the processor, the anonymous mail to a mailbox corresponding to the receiver mailbox ID;
after the encapsulating, by the processor, the mail template into an anonymous mail that comprises no receiver mailbox ID and no sender mailbox ID, the method further comprises:
if no receiver mailbox ID is obtained, caching, by the processor, the anonymous mail in a mail pool and storing, by the processor, a mapping relation between the sender mailbox ID and a mail ID of the anonymous mail.

2. The method according to claim 1, wherein the obtaining, by the processor, a receiver mailbox ID comprises:
selecting randomly one mailbox ID that is different from the sender mailbox ID from a mailbox ID list and using the selected mailbox ID as the receiver mailbox ID, where the mailbox ID list is used to store all mailbox IDs of mailboxes applied for by users; or
obtaining a receiver mailbox ID from the mailbox ID list according to a delivery policy.

3. The method according to claim 2, wherein the obtaining a receiver mailbox ID from the mailbox ID list according to a delivery policy comprises:
obtaining mailbox IDs of users located in the same city as the sender from the mailbox ID list, selecting randomly one mailbox ID that is different from the sender mailbox ID from the obtained mailbox IDs, and using the selected mailbox ID as the receiver mailbox ID; or
determining gender and age of a receiver according to gender and age of the sender, obtaining mailbox IDs of users that match the determined gender and age of the receiver from the mailbox ID list, selecting randomly one mailbox ID that is different from the sender mailbox ID from the obtained mailbox IDs, and using the selected mailbox ID as the receiver mailbox ID.

4. The method according to claim 1, after the obtaining, by the processor, a receiver mailbox ID, further comprising:
storing, by the processor, a mapping relation among the sender mailbox ID, the receiver mailbox ID, and a mail ID of the anonymous mail.

5. The method according to claim 4, after the delivering, by the processor, the anonymous mail to a mailbox corresponding to the receiver mailbox ID, further comprising:
receiving, by the processor, an anonymous mail reply request submitted by a receiver, obtaining, by the processor, the sender mailbox ID from the stored mapping relation among the receiver mailbox ID, the sender mailbox ID, and the mail ID according to the mail ID of the anonymous mail replied by the receiver and the receiver mailbox ID, and delivering, by the processor, the anonymous mail replied by the receiver to a mailbox corresponding to the sender mailbox ID.

6. The method according to claim 1, after the encapsulating, by the processor, the mail template into an anonymous mail that comprises no receiver mailbox ID and no sender mailbox ID, further comprising:
receiving, by the processor, a mail receiving request submitted by a receiver, selecting, by the processor, one anonymous mail from the mail pool that caches anonymous mails sent by senders, and delivering, by the processor, the selected anonymous mail to a mailbox of the receiver.

7. The method according to claim 6, wherein the selecting, by the processor, one anonymous mail from the mail pool that caches anonymous mails sent by senders comprises:
selecting an anonymous mail sent by a sender located in the same city as the receiver from the mail pool; or selecting one anonymous mail from the mail pool according to gender and age of the receiver.

8. The method according to claim 7, after the selecting, by the processor, one anonymous mail from the mail pool that caches anonymous mails sent by senders, further comprising:
obtaining, by the processor, a mailbox ID of the sender that sends the selected anonymous mail from the stored mapping relation between the sender mailbox ID and the mail ID according to a mail ID of the selected anonymous mail; and storing, by the processor, a mapping relation among the mailbox ID of the sender that sends the selected anonymous mail, the receiver mailbox ID, and the mail ID of the selected anonymous mail.

9. The method according to claim 6, after the selecting, by the processor, one anonymous mail from the mail pool that caches anonymous mails sent by senders, further comprising:
obtaining, by the processor, a mailbox ID of the sender that sends the selected anonymous mail from the stored mapping relation between the sender mailbox ID and the mail ID according to a mail ID of the selected anonymous mail; and storing, by the processor, a mapping relation among the mailbox ID of the sender that sends the selected anonymous mail, the receiver mailbox ID, and the mail ID of the selected anonymous mail.

10. An email system, comprising:
a processor; and
a computer-readable medium for storing program codes, which, when executed by the processor, cause the processor to:
receive a mail sending request which carries a mail template filled out by a sender;
encapsulate the mail template into an anonymous mail that comprises no receiver mailbox ID and no sender mailbox ID;
obtain a receiver mailbox ID and deliver the anonymous mail to a mailbox corresponding to the receiver mailbox ID; and
if no receiver mailbox ID is obtained, cache the anonymous mail in a mail pool and store a mapping relation between the sender mailbox ID and a mail ID of the anonymous mail.

11. The email system according to claim 10, wherein when the program codes cause the processor to obtain a receiver mailbox ID and deliver the anonymous mail to a mailbox corresponding to the receiver mailbox ID, the program codes cause the processor specifically to:
select randomly a mailbox ID that is different from the sender mailbox ID from a mailbox ID list and use the selected mailbox ID as the receiver mailbox ID, where the mailbox ID list is used to store all mailbox IDs of mailboxes applied for by users; and
deliver the anonymous mail to a mailbox corresponding to the receiver mailbox ID.

12. The email system according to claim 10, wherein when the program codes cause the processor to obtain a receiver mailbox ID and deliver the anonymous mail to a mailbox corresponding to the receiver mailbox ID, the program codes cause the processor specifically to:
- obtain a receiver mailbox ID from a mailbox ID list according to a delivery policy; and
- deliver the anonymous mail to a mailbox corresponding to the receiver mailbox ID.

13. The email system according to claim 12, wherein when the program codes cause the processor to obtain a receiver mailbox ID from a mailbox ID list according to a delivery policy, the program codes cause the processor specifically to:
- obtain mailbox IDs of users located in the same city as the sender from the mailbox ID list, select randomly one mailbox ID that is different from the sender mailbox ID from the obtained mailbox IDs, and use the selected mailbox ID as the receiver mailbox ID; or
- determine gender and age of a receiver according to gender and age of the sender, obtain mailbox IDs of users that match the determined gender and age of the receiver from the mailbox ID list, select randomly one mailbox ID which is different from the sender mailbox ID from the obtained mailbox IDs, and use the selected mailbox ID as the receiver mailbox ID.

14. The email system according to claim 10, the program codes further cause the processor to:
- store a mapping relation among the sender mailbox ID, the receiver mailbox ID, and a mail ID of the anonymous mail.

15. The email system according to claim 14, the program codes further cause the processor to:
- receive an anonymous mail reply request submitted by a receiver, obtain the sender mailbox ID from the stored mapping relation among the receiver mailbox ID, the sender mailbox ID, and the mail ID according to the mail ID of the anonymous mail replied by the receiver and the receiver mailbox ID, and deliver the anonymous mail replied by the receiver to a mailbox corresponding to the sender mailbox ID.

16. The email system according to claim 10, the program codes further cause the processor to:
- receive a mail receiving request submitted by a receiver, select one anonymous mail from the mail pool that caches anonymous mails sent by senders, and deliver the selected anonymous mail to a mailbox of the receiver.

17. The email system according to claim 16, wherein when the program codes cause the processor to receive a mail receiving request submitted by a receiver, select one anonymous mail from the mail pool that caches anonymous mails sent by senders, and deliver the selected anonymous mail to a mailbox of the receiver, the program codes cause the processor specifically to:
- receive a mail receiving request submitted by a receiver and select one anonymous mail sent by a sender located in the same city as the receiver from the mail pool; or, select one anonymous mail from the mail pool according to gender and age of the receiver and deliver the selected anonymous mail to a mailbox of the receiver.

18. The email system according to claim 17, wherein when the program codes cause the processor to receive a mail receiving request submitted by a receiver and select one anonymous mail sent by a sender located in the same city as the receiver from the mail pool; or, select one anonymous mail from the mail pool according to gender and age of the receiver and deliver the selected anonymous mail to a mailbox of the receiver, the program codes cause the processor specifically to:
- obtain a mailbox ID of a sender that sends the selected anonymous mail from a stored mapping relation between the sender mailbox ID and the mail ID according to the mail ID of the selected anonymous mail; and
- store a mapping relation among the mailbox ID of the sender that sends the selected anonymous mail, the receiver mailbox ID, and the mail ID of the selected anonymous mail.

19. The email system according to claim 16, wherein when the program codes cause the processor to receive a mail receiving request submitted by a receiver, select one anonymous mail from the mail pool that caches anonymous mails sent by senders, and deliver the selected anonymous mail to a mailbox of the receiver, the program codes cause the processor specifically to:
- obtain a mailbox ID of a sender that sends the selected anonymous mail from a stored mapping relation between the sender mailbox ID and the mail ID according to the mail ID of the selected anonymous mail; and
- store a mapping relation among the mailbox ID of the sender that sends the selected anonymous mail, the receiver mailbox ID, and the mail ID of the selected anonymous mail.

\* \* \* \* \*